(12) United States Patent
Dahl

(10) Patent No.: US 7,437,801 B2
(45) Date of Patent: Oct. 21, 2008

(54) CASTER ASSEMBLY AND SHELF SYSTEM FOR USE ON A COLLAPSIBLE CART

(76) Inventor: Gary Michael Dahl, 7802 High Star, Houston, TX (US) 77038

( * ) Notice: Subject to any disclaimer, the term of this patent is extended or adjusted under 35 U.S.C. 154(b) by 64 days.

(21) Appl. No.: 11/036,880

(22) Filed: Jan. 14, 2005

(65) Prior Publication Data

US 2007/0039129 A1    Feb. 22, 2007

(51) Int. Cl.
*B60B 33/00* (2006.01)
(52) U.S. Cl. ............... 16/38; 16/37; 16/18 R
(58) Field of Classification Search ....... 16/37, 16/38, 18 R, 45, 19, 29, 31 A, 31 R, 35 D, 16/30
See application file for complete search history.

(56) References Cited

U.S. PATENT DOCUMENTS

| | | | |
|---|---|---|---|
| 164,226 A | | 6/1875 | Sheldon |
| 623,157 A | * | 4/1899 | Hunter ............... 280/79.3 |
| 1,345,622 A | * | 7/1920 | Nack ............... 16/18 R |
| 1,491,097 A | * | 4/1924 | Hoffman ............... 280/43 |
| 2,700,173 A | * | 1/1955 | Huffman ............... 16/44 |
| 2,943,889 A | * | 7/1960 | Woldring et al. ....... 301/64.304 |
| 3,283,358 A | | 11/1966 | Merriam |
| 3,785,669 A | | 1/1974 | Doheny |
| 4,009,891 A | | 3/1977 | Jensen |
| 4,084,288 A | * | 4/1978 | Black ............... 16/21 |
| 4,097,954 A | | 7/1978 | Christensen |
| 4,188,048 A | * | 2/1980 | Haung et al. ........ 280/124.178 |
| 4,217,944 A | * | 8/1980 | Pascal ............... 152/323 |
| 4,224,714 A | | 9/1980 | Salpos |
| 4,284,286 A | | 8/1981 | Lewallen |
| 4,565,382 A | | 1/1986 | Sherman |
| 4,707,880 A | | 11/1987 | Doyle |
| 4,709,444 A | | 12/1987 | Black |
| 4,969,230 A | | 11/1990 | Huang |
| 5,004,263 A | | 4/1991 | Hubbard |
| 5,160,182 A | | 11/1992 | Chang |
| 5,201,536 A | | 4/1993 | Bono et al. |
| 5,228,716 A | | 7/1993 | Dahl |
| 5,476,282 A | | 12/1995 | Dahl |
| 5,536,034 A | | 7/1996 | Miller |
| 5,809,612 A | | 9/1998 | Finch |
| 6,463,624 B1 | * | 10/2002 | Su ............... 16/20 |
| 6,786,559 B1 | * | 9/2004 | Kidd et al. ............... 301/5.23 |
| 6,810,561 B1 | | 11/2004 | Liu |

FOREIGN PATENT DOCUMENTS

EP     123298 A1 * 10/1984

* cited by examiner

*Primary Examiner*—William L. Miller
(74) *Attorney, Agent, or Firm*—John Karl Buche; Buche & Associates, P.C.

(57) ABSTRACT

Disclosed is a lightweight caster assembly and modular shelf system for use on an existing collapsible foldable cart with four wheels.

10 Claims, 4 Drawing Sheets

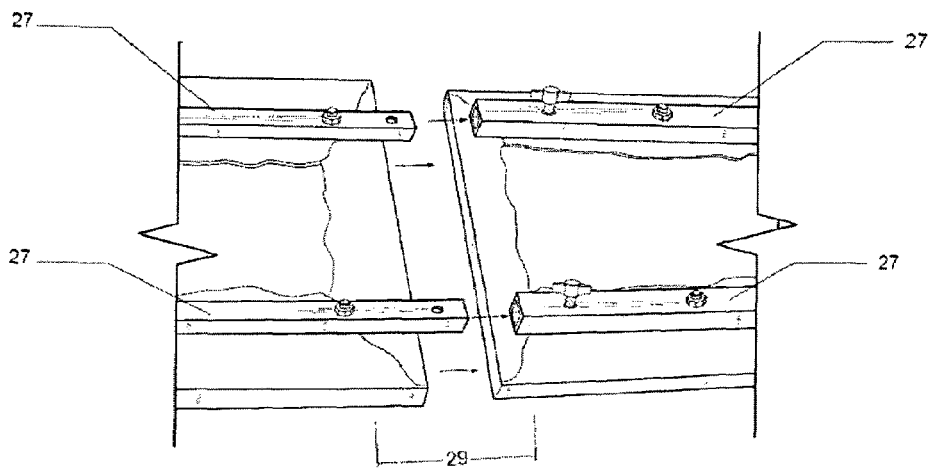
FIG. 5
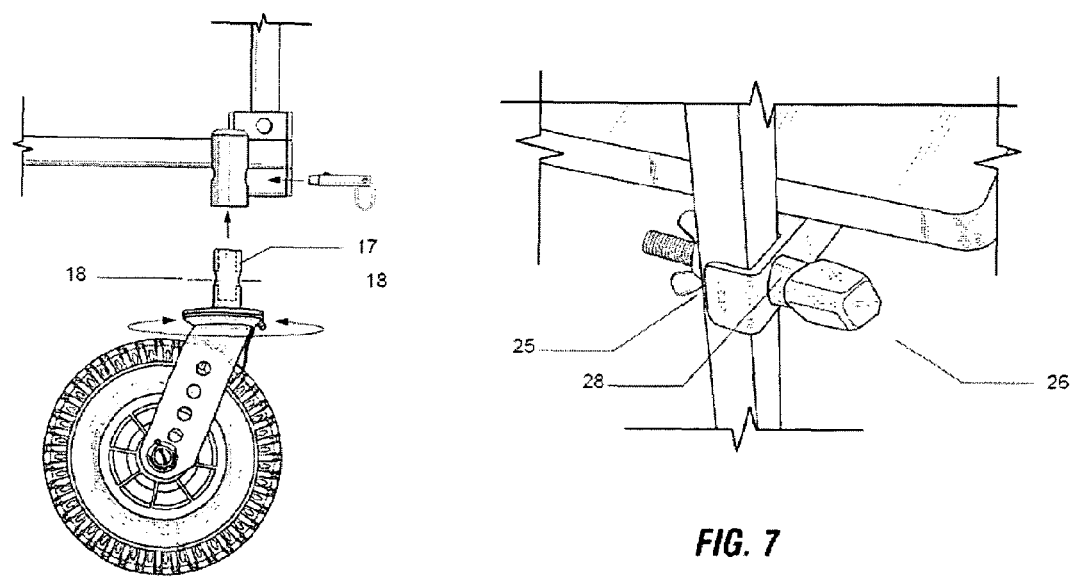
FIG. 6
FIG. 7

CASTER ASSEMBLY AND SHELF SYSTEM FOR USE ON A COLLAPSIBLE CART

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The present invention relates to the field of material handling and carts.

2. Description of Prior Art

Many improvements have been made in the field of carts and dollies. The present inventor, Dahl, in U.S. Pat. No. 5,228,716, teaches a cart with foldable sides and a telescoping frame adapted to accommodate numerous shapes and sizes of cargo. Dahl's first carts utilized relatively small diameter swivel casters with solid wheels that were problematic for users who needed to traverse grass or dirt, particularly with heavy loads. Many professional film crews and sound crews require carts that would feature 4 pneumatic wheels to roll heavy equipment over rough terrain, such as grass football fields, that nonetheless will fold to a small storage size for easy transport in SUVs or airlines. Because all known 4-wheeled carts featuring pneumatic wheels are extremely heavy and bulky, they are not functional in terms of folding to a small storage size for use in smaller vehicles or airlines, where sheer bulk of the carts displace valuable space needed for equipment storage. Furthermore, airlines have recently raised rates for extra cargo, making lower weight and size of traveling equipment crucial. In addition to the need of pneumatic wheel units mounted on a foldable cart, video and sound crews often require a shelf that would attach quickly to the cart in the field in order to support camera, video, or sound equipment. The inventor set about creating a collapsible cart and expandable shelf system that would remedy these concerns.

Others have realized the usefulness of pneumatic wheels on carts, however, they have failed to solve the problems of weight, transportability, or to effectively eliminate caster "shudder" or "chatter" while a cart is rolling. U.S. Pat. No. 3,785,669 to Doheny teaches a convertible cart that is often used by video professionals who have sometimes replaced the original 5" swivel casters with pneumatic swivel casters. However, this cart is extremely heavy, bulky, and does not fold down with the pneumatic casters attached. In addition, the frame fails to retract in length making the storage size unsuitable for SUV's, etc. U.S. Pat. No. 4,009,891 teaches a convertible cart that does not fold small for storage, is extremely heavy, and does not feature pneumatic casters which would require extensive redesigning of the frame. Regarding technology relating to a cart shelf to support camera, video or sound equipment, others have attempted such an improvement, but have not done so in a manner that teaches the limitations of the present invention. For instance, U.S. Pat. No. 5,536,034 to Miller teaches a convertible bulk hand truck and tabletop, however, this is essentially a table mounted to Doheny's cart. Unfortunately, the Miller technology as configured was too bulky and heavy when transporting in a vehicle or airline. The present invention is materially different in form and function. Other wheeled devices and table combinations are shown in U.S. Pat. Nos. 4,284,286, 4,565,382, 5,004,263; 5,160,182; 5,201,536, however, none of these patents have configurations and functional capability of serving as a two wheeled dolly and four wheeled cart while also including features that serve to convert the four wheeled cart into a portable work table.

Because of the substantial demands of film and video crews for extremely collapsible carts to carry extremely heavy loads over rough terrain, the present invention typically employs four 8-10" diameter pneumatic wheel units on the inventor's collapsible cart. Although such pneumatic wheel units are naturally lighter than solid tire counterparts, the inherent diameter of the wheel still presents a significant challenge in terms of portability and weight. These factors contributed to the genesis of the invention of this cart model. Obstacles included but were not limited to oversized and excessively heavy mounting plates on commercially available caster and wheel units that could not be utilized without significantly interfering with the functionality of the cart. Typical pneumatic plate casters were far too heavy (exceeding 7-8 pounds each), which when used in the inventor's 2-wheel handtruck configuration caused the inventor's previous carts to become top-heavy and topple over. The frame design used by the inventor on the entire frame design weighed less than 25 pounds without the casters, so this excessive weight was unacceptable. U.S. Pat. No. 3,283,358 to Merriam teaches such a common plate caster, however, this design is extremely heavy, and tended to interfere with the operation of the inventor's cart. Typical plate casters with pneumatic wheels were not usable because the width of the mounting plates (typically 4"×4.5" diameter) would strike against the frame components and interfere with the folding handle operation of the cart. In addition, mounting the steel plate to the square tube front axel of the inventor's cart was cumbersome, heavy, bulky, and negated many of the design goals of the inventor. The bulky caster mounting plate would constantly snag on items during storage/transport and would require significant widening of the front axel, a feature further discussed herein. During the inventive process, and in researching available caster and wheel technologies, the inventor found that existing units featured bulky bearing caps that would interfere with operation and the release mechanisms of the foldable handles. Although pneumatic stem (post) casters are available, they too were also found too heavy and bulky to allow the inventor's cart to function correctly. Because of weight, they also would cause the cart to topple over when used in upright 2-wheel handtruck position (one of the inventor's cart's foldable positions). For instance, U.S. Pat. No. 4,709,444 to Black teaches a stem caster wheel unit secured by pins, but this caster is not removable and the stem is solid which added too much weight. In addition, the horn assembly of Black weighted too much if enlarged to accommodate an 8" diameter pneumatic wheel. U.S. Pat. No. 164,226 to Sheldon teaches a stem furniture caster that has no way of securing the stem inside the furniture to accommodate constant removal and if the article was to be constantly lifted off of the ground. Similarly, U.S. Pat. No. 4,969,230 to Huang and U.S. Pat. No. 4,707,880 to Doyle teach removable stem casters, however the solid stem was also determined too heavy for application with inventor's cart. U.S. Pat. No. 4,224,714 to Salpos discloses a caster essentially designed for use with wood furniture, which is unsuitable. U.S. Pat. No. 6,810,561 to Liu teaches a ring stem caster with a threaded bolt that would be far too heavy when enlarged to accommodate 8" diameter pneumatic tires. For these reasons, the inventor developed a novel wheel and caster unit with a small bearing cap and modified tube stem extending therefrom.

Another major problem addressed by this invention is that pneumatic swivel casters tend to shudder excessively when mounted on a cart with a lightweight frame. This "chatter" or "shudder" (side-to-side wobbling) is very undesirable when transporting delicate and expensive photo, video, or musical equipment (or any other cargo) and greatly reduces the cart's functionality. This problem is also compounded because large rubber pneumatic tires have a tendency while rolling to stick slightly or grab on hard surfaces such as concrete. The lighter the cart frame, the more pronounced are such problems. The combination of the inventor's lightweight frame (approximately 25 lb.) and the large diameter of the pneumatic casters (8-10" diameter), created excessive caster chatter when installed on inventor's cart frame. This chatter would render inventor's cart unusable as a viable equipment mover. The inventor attempted to solve the problem with commercially available technologies—to no avail. U.S. Pat. No. 5,809,612 to Finch teaches an anti-shimmying caster wheel, however, it is functionally different than this inventor's solution. Finch's technology was also heavy and not an economically viable alternative for use with the present invention. U.S. Pat. No. 4,097,954 to Christiansen teaches a flutter-resistant caster that would cause premature bearing wear when used with a caster featuring 8" or larger diameter wheels and heavy loads. In addition, the plate mount was undesirable because of weight and bulk.

In addition, inventor's frame needed to be significantly redesigned to accommodate this caster and still meet the original design goals of the cart in terms of small storage size, expandable frame, stability and steady transport. Early in the design process, research determined that the cart would topple over when making sharp turns with pneumatic casters installed in the same position as smaller casters on previous carts. To maintain turn stability and maintain a small storage size, further research revealed a preferable width of a front axle on the frame of the cart of at least eighteen inches in width. The inventor's cart had the front axel modified accordingly to accommodate this new type of caster and to prevent toppling of the cart when the cart made sharp turns. The pneumatic swivel casters were therefore positioned farther apart on the front axle than the smaller casters on previous carts.

To further transform inventor's cart into a field workstation while meeting Dahl's original design goals, a new type of shelf system was designed which featured light weight, fast set-up, and small storage size for transport when removed from the cart. In addition, this shelf could change length that could be mirrored by altering the length of the inventor's telescoping cart. This feature is extremely advantageous in situations when space was at a premium in the field, using a small equipment set-up, or navigating the labyrinth hallways in auditoriums, hotels, etc. The shelf was attached to the cart via holes in the foldable handles and using wingbolts and wingnuts. U-shaped brackets welded to the steel shelf support tubes fit over the vertical cart handles providing a rigid shelf platform when the wingbolts were tightened.

SUMMARY OF THE INVENTION

Accordingly, to meet the inventor's original design goals and accommodate inventor's cart frame, it is a primary object of the present invention to provide a new type of pneumatic caster and mounting system featuring preferences including nominal weight, structural strength, economical manufacturing costs, a wheel chatter dampener, a slimmer profile than typical pneumatic casters, a preferable expandable shelf attachment, and a new method of attaching the foregoing to the frame to function with inventor's collapsible cart.

It is the object of this invention to design a cart featuring an expandable frame, foldable sides, that transforms into at least three configurations, will accommodate two pneumatic rear wheels, two pneumatic caster wheel units, fold down to a small storage size for transport, and accommodate a shelf system that attaches/detaches quickly in the field.

It is an object of this invention to design a cart featuring an axle with strategically positioned holes drilled in the front axle, thereby reducing the front axle weight, maintain structural strength, provide an area where bungee cords can be mounted, and improve the weight balance ratio of the cart frame such that the cart could function as a 2-wheel hand truck without toppling over when pneumatic casters installed on said cart frame.

It is an object of this invention to provide a lightweight pneumatic caster that will allow inventor's cart frame to function in configurations similar to those with 5" wheel diameter or smaller casters.

It is the object of this invention to design to provide a pneumatic caster that is approximately 40% lighter than typical pneumatic casters, and which will allow inventor's cart to function as a two-wheel handtruck and fold to a small storage size.

It is the object of this invention to feature a caster with polymer hubs so as to significantly reduce the weight of steel hubs.

It is the object of this invention to provide a pneumatic caster featuring a tube axle with retaining cotter pins, or similar means, to reduce weight and eliminate typical heavy bolt axles with nuts.

It is the object of this invention to provide a pneumatic caster featuring a tube axle with retaining cotter pins so as to facilitate extremely fast tire replacement in the field with a bare minimum of tools.

It is the object of this invention to provide a pneumatic caster that is inexpensive to manufacture.

It is the object of this invention to provide a pneumatic caster featuring a specially machined vertical tube stem that is structurally strong, yet lightweight, so as to attach the caster to the cart front axle. In addition, this stem must be designed such that the stem could be swaged from below the bearing races in order to secure the stem, bearing races, and yoke as one assembly.

It is the object of this invention to provide a pneumatic caster featuring strategically positioned holes in the caster horn to reduce weight yet maintain structural strength.

It is the object of this invention to provide a pneumatic caster featuring a horn composed of thinner wall steel than similar size casters so as to significantly reduce the weight of the overall caster.

It is the object of this invention to provide a pneumatic caster featuring lightweight roller bearings surrounding the tube axle to eliminate heavier ball bearing casings.

It is the object of this invention to provide a pneumatic caster featuring at least one aperture drilled in each stem so as to facilitate a pin, preferably clevis or cotter, for easy removal or replacement in the field, thereby eliminating the need for a large, heavy nut required by a solid threaded stem. Furthermore, such pin can be instantly pulled and the wheel removed so as to render that cart even smaller for transport if necessary.

It is the object of this invention to provide a pneumatic caster featuring a chatter dampener comprising an oversized elastomeric O-ring which hugs the outside of the bearing cap—situated in the gap between the upper and lower bearing caps—yet with just enough resistance to prevent chatter and yet allow the caster wheel to freely swivel It is the object of this invention to provide a shelf system that will quickly and easily attach and detach from inventor's cart in the field without special tools.

It is the object of this invention to provide a shelf system that will have structural integrity yet break down to a small size for storage and transport, and which will easily attach to inventor's cart.

It is the object of this invention to provide a shelf system that may vary in length so as to accommodate different field environment needs as well as the expandable frame of inventor's cart.

These and other objects, advantages, and features of the present invention will become more apparent from the following detailed description when taken together with the accompanying drawings.

BRIEF DESCRIPTION OF THE DRAWING

The manner in which these objectives and other desirable characteristics can be obtained is explained in the following description and attached drawings in which:

FIG. 5 is a bottom perspective view of the two piece shelf-system of the present invention that shows how the frames of the respective pieces are adapted to connect to one another to form an extended shelf when the telescoping cart is in extended form.

FIG. 6 is a side perspective view demonstrating how the caster unit of the present invention is adapted to fit into the cart frame where it is secured.

FIG. 7 is a close-up perspective top view of a preferable connecting means for securing the shelf to the handle of the cart.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
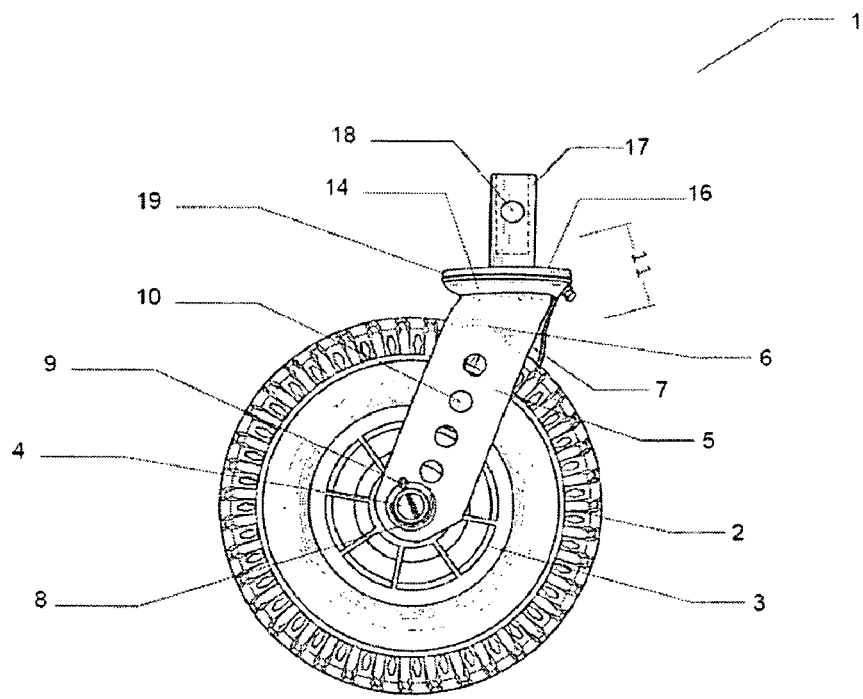
FIG. 1 is a side perspective view of the disclosed caster unit.

FIG. 1 is a side perspective view of the caster unit 1 disclosed in the present application. The caster unit 1 features a pneumatic tire 2 with a lightweight hub 3 disposed centrally within the pneumatic tire 2. The hub 3 is preferably of polymer construction, although lightweight aluminum, lightweight alloys, ceramics and composite materials are also contemplated. Rather than a solid axle as found on other commercial casters, the caster unit 1 features a hollow tube axle 4 that extends through a central channel of the hub 3. The hollow tube axle 4 extends through said hub 3 and extends on opposite sides of said hub 3 and connects to a horn 5 of the caster unit 1. The horn 5 has a first side 6 and second side 7 and forms a fork over and around hub 3 and tire 2. The horn sides (6 and 7) receive the hollow tube axle 4 through axle receiving apertures 8 disposed on a lower portion of the horn sides (6 and 7). The hollow tube axle 4 is securely fixed to the respective horn sides (6 and 7) through use of a securing means 9, which is preferably a cotter pin that extends through a plurality of holes drilled at the ends of the hollow tube axle 4 that protrudes through the horn side (6 and 7). The use of a hollow tube axle 4 is an important feature of the present invention because of the reduction in weight it affords. A preferable diameter of such a hollow tube axle 4 is in the range of 15 to 20 millimeters. The securing means 9 in the preferable form of a cotter pin is also beneficial for purposes of weight and bulk reduction. For similar reasons of weight reduction, the inventor has punched a plurality of horn holes 10 in each of the horn sides (6 and 7). The steel used to construct horn 5 is preferably of ⅛-inch thickness. The inventor contemplates that other materials may be used for horn 5, for instance, aluminum, alloys, and composites. The horn sides (6 and 7) extend upward where they fuse to the underside of a bearing retainer unit 11.

The bearing retainer unit 11 of the present invention shares certain features commonplace to most commercially available double ball race casters. It is generally known in the caster industry that double race swivel casters have two rows of ball bearings moving independently through two levels of ball races. In all double race swivel casters, retainers encapsulate the rows of ball bearings, with bearings and retainers held together by a centrally fixed stem or bolt extending therethrough, but which securing of components does not restrict the swivel action of the caster or caster horn fixed to a wheel unit. Single bearing race casters can operate as a bearing retainer unit 11 for this invention, however, it is preferable to use double ball race casters. The top ends of commercially swivel casters are further typically defined by either a "stem" or a mounting "plate," both of which are adapted to attach to whatever object is in need of a caster. The bearing retainer unit 11 of the present invention is preferably comprised of a lower retainer 12, on which sit the lower bearings 13. The lower bearings 13 are a plurality of ball bearings that form a ring for purposes of swivel function and load bearing. The lower bearings 13 are bound from above by the bottom surface of an upper retainer 14. On the top surface of upper retainer 14 rest upper bearings 15, which are also a plurality of ball bearings that form a ring for purposes of swivel function and load bearing. A bearing cap 16 contains the upper bearings 15 from above. A tube stem 17 defines the top of the inventor's bearing retainer unit 11 and extends centrally through the bearing cap 16, upper 14 and lower 12 retainers which encapsulate upper 15 and lower 13 bearings. The inventor's bearing retainer unit 11 is preferably held together as one assembly by "swaging." It should also be noted that the inventor's bearing cap 16 is notably smaller than most commercially available casters, preferably rounded, and formed of lightweight industrial materials, for instance, thin steel or aluminum. As with most commercially available casters, the inventor's first 6 and second 7 horn sides connect rigidly to the bearing retainer unit 11 preferably at the underside of the upper retainer 14. The horn unit 5 and upper retainer 14 may be preferably formed as a single forged or cast unit.

Important distinguishing features of this invention include a tube stem 17 with an upper exposed portion (portion above the bearing cap 16) of the tube stem 17 being partially hollow. Up to eighty (0-80%) of the exposed portion of the tube stem 17 may be hollow. This hollowed tube stem 17 may be accomplished by a variety of means, including but not limited to casting, machining, molding, etc. The hollowed stem contributes to the overall lessening of cart weight; and because it is not completely hollow, it will have enhanced strength where needed at its base. It is expected that those skilled in the art will appreciate the utility of this feature for applications other than the inventor's cart. Also, it should be noted that because the lower exposed portion of the tube stem 17 is not hollow, it is capable of supporting the "swaging" action used to compress and secure the bearings, retainers and bearing cap assembly.

Also disposed along the hollow portion of the tube stem 17 are at least one, and preferably two oppositely situated tube stem apertures 18. Tube stem apertures 18 permit securing of the caster unit 1 to any item to which the caster unit 1 needs to be secured, such as the inventor's cart, by securing means that extend through the tube stem apertures 18. A preferable stem securing means is a clevis pin, particularly since easy separation of the caster unit 1 from the object to which it is attached (such as a cart) is desirable for purposes of transportability. Other stem securing means may be used that accomplish the purpose of securing the caster to an item, for instance a cart, but the clevis pin has been found most suitable for the inventor's purposes. A cotter pin, a combination clevis pin with ball-and-detent mechanism, rapid release removable pins, or even a screw and bolt apparatus will also be typical preferable tube stem securing means.

A major problem with prior art casters solved by the present invention is the "chatter" or "shudder" (rapid side-to-side motion) of casters while rolling. The chatter problem is further compounded when a caster is attached to a light frame, such as the inventor's cart. The inventor has solved this problem through use of a chatter dampener 19. This chatter dampener 19 is fixed along the periphery and between the upper bearing cap 16 and upper retainer 14 of the bearing retainer unit 11. These are the terms used for the inventor's disclosure; however, the critical location for use of a chatter dampener 19 is along the periphery and just between the swivel unit and the upper stationary unit, which in the inventor's caster unit 1 is described as the upper retainer 14 and respective bearing cap 16. The chatter dampener 19 operates by slightly checking and adding resistance to the swivel motion of the caster unit 1. Preferably, the chatter dampener 19 is an elastomeric ring, or an O-ring, that hugs the outside of the gap that is found around the periphery and between the bearing cap 16 and upper retainer 14. The chatter dampener 19 is of a diameter just large enough so that it does not retract into the gap found around the periphery where it would unduly interfere with swivel function. Rather, the chatter dampener 19 slightly protrudes from the gap to dampen the swivel and corresponding "chatter" motion. The chatter dampener 19 is typically installed by the method of pulling it over the stem side of the caster unit 1 and affixing the same securely along the outside of the gap spanning between the bearing cap 16 and upper retainer 14. The inventor contemplates that a variety of materials could be used to form the chatter dampener 19, including but not limited to rubber, silicon, plastic, or composite materials.

The caster unit 1 of the present invention weighs in the range of 3 to 5 pounds when fitted with an 8-inch pneumatic tire (2.50-4). This is compared to a typical commercially available caster unit weighing 7.9 pounds. The weight of the inventor's caster unit 1 is, therefore, in the range of thirty (30%) to fifty (50%) lighter than comparable technologies. Considering that four wheels are commonly used on many carts, this could easily reduce weight by thirteen (13) pounds.

Figure 2:
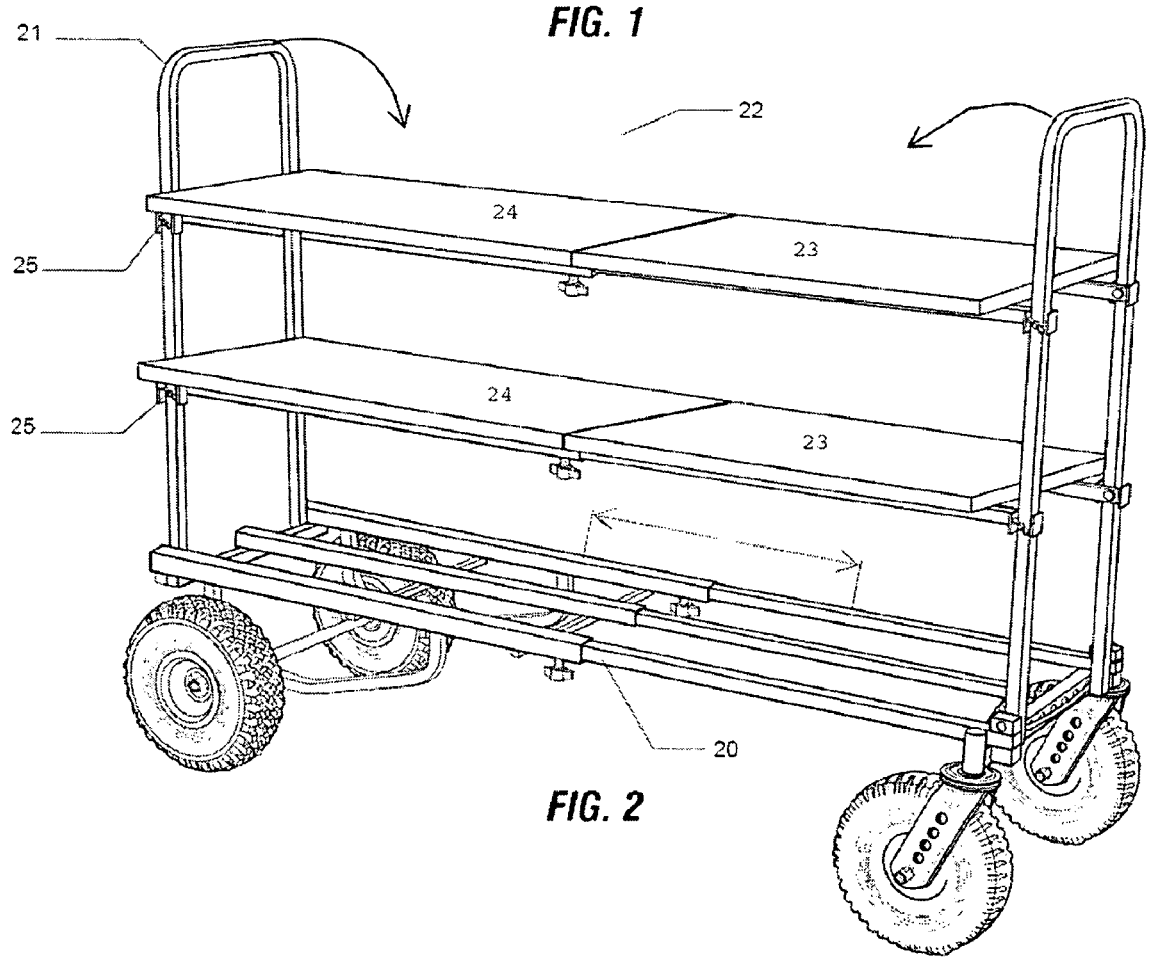
FIG. 2 is a side perspective view of the collapsible, foldable cart featuring the disclosed caster unit of FIG. 1 and a new shelf system.
Figure 3:
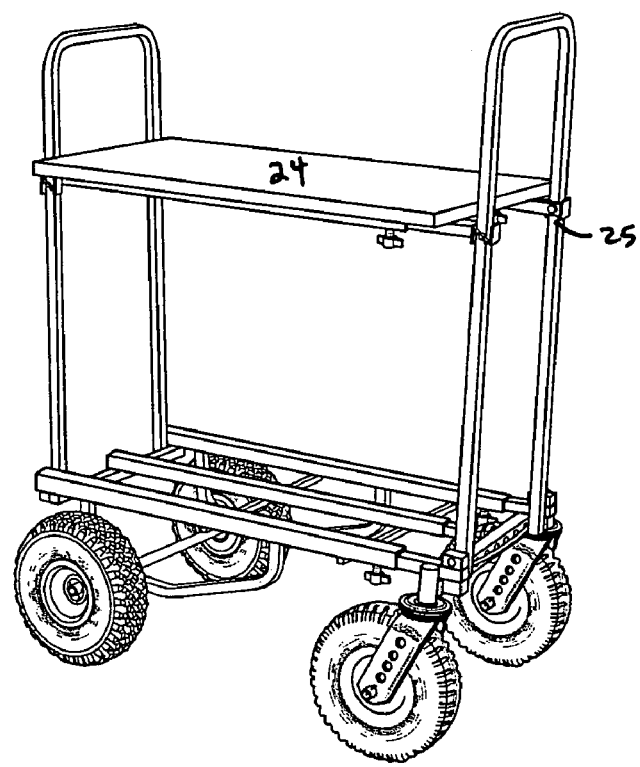
FIG. 3 is a side perspective view of the cart of the present invention in a truncated form with the shelf unit.
Figure 4:
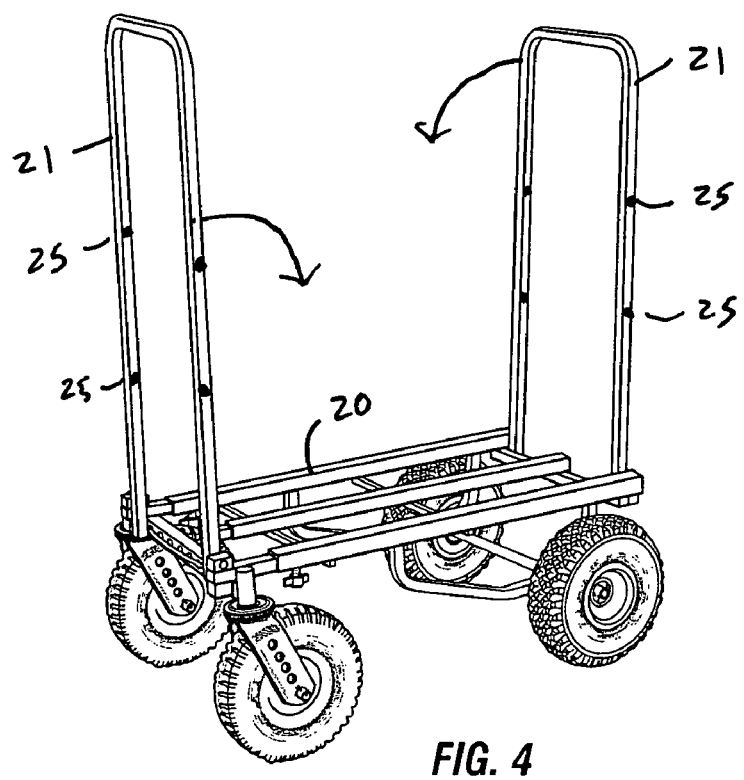
FIG. 4 is a side perspective view of the inventor's cart featuring the caster unit, but without the shelf unit.
Figure 8:
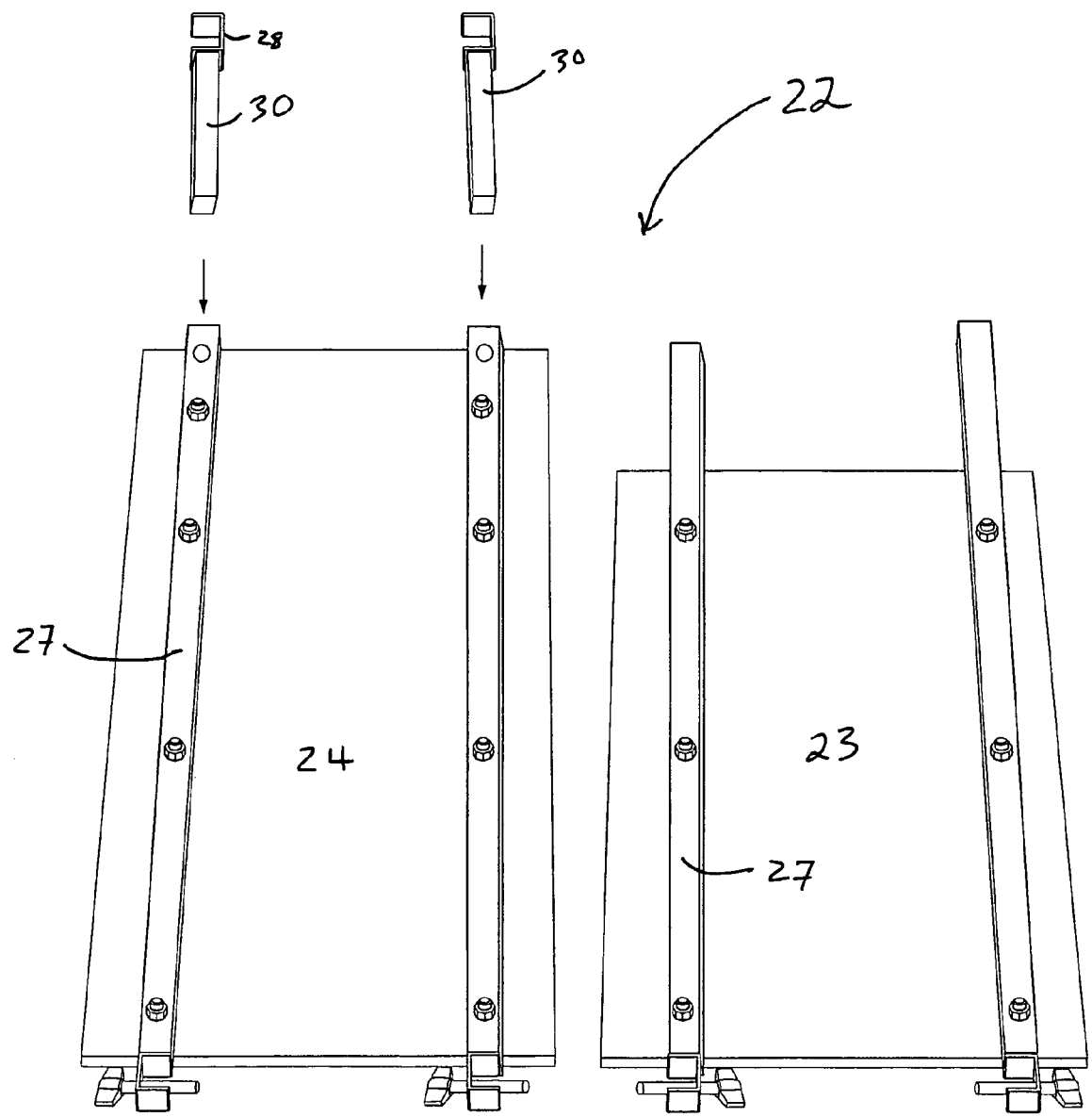
FIG. 8 is a bottom perspective view of two respective components of the modular shelf system which can be fastened together and used as a single elongated shelf, or where one of the respective shelf units may be used in conjunction with the bracket inserts to form a truncated shelf for use with the cart.

To further enhance the utility of the present cart, the inventor developed a modular shelf system that expands consistent with the collapsible or telescoping feature of the inventor's existing carts. As can be seen in FIG. 2 (expanded cart) and FIGS. 3 and 4 (truncated cart), the inventor's cart has a telescoping frame 20 that increases or decreases in length, depending on the user's needs, and which frame is then secured with an extension stop pin mechanism and as well by manual twisting of a spring assisted bolt. This basic function is disclosed in inventor Dahl's previous U.S. Pat. Nos. 5,228,716 and 5,476,282. Also shown are the handles 21 on opposite sides of the telescoping frame 20, which are foldable down flush with the telescoping frame 20. Thus, basic functionalities of the existing invention were a foldable, collapsible cart with four wheels. The inventor now discloses a shelf system 22 that accommodates the telescoping feature of the cart. The shelf system 22 comprises a first shelf unit 23 and a second shelf unit 24. If first shelf unit 23 and second shelf unit 24 are fixed to one another, they preferably extend to fit the length of the cart in extended telescoping mode, which is typically and preferably approximately 53 inches in length. If a truncated cart and shelf is desired, the system is adapted so that the user of the cart will modify the second shelf unit 24 so that it fits between and fixes to opposite handles 21 of the cart. In truncated form, the shelf is typically and preferably approximately 29 inches in length. Shelves are adapted to connect at furthest ends of the shelves to the handles 21 located on opposite ends of the cart. As shown in FIGS. 2, 3, 4 and close-up FIG. 7, shelves attach to handles 21 at the point of handle apertures 25, a plurality of which are preferably located along the length of the handles 21. Multiple sets of handle apertures 25 may be located along the length of the handles 21 to accommodate a plurality of shelf units, or to accommodate alternate placement choices for one shelf on the length of the handles 21 of the cart. As shown in FIGS. 2, 3, 4 and 7, a connector means 26 is used to fix the shelf ends to the handles 21. A preferable connector means 26 is in the form of a U-bracket extending from and disposed at the ends of the shelf frame 27. U-brackets are preferable for the present invention because they fit snugly around the cart handles 21 which are preferably made from square tube steel. U-brackets are preferably fixed in place by a pin mechanism extending through bracket holes 28 in the U-bracket and the handles 21 of the cart. Pin mechanisms commonly suitable would be coffer pins, clevis pins, ball and detent pins, bolt and wing-nuts, etc. As shown in FIGS. 5 and 8, both first shelf unit 23 and second shelf unit 24 are supported by a shelf frame 27 that is comprised of solid supports, preferably square tube steel or aluminum, running the length of the respective shelf units. This invention employs at least two solid supports of preferable tube steel that also preferably are fixed to the underside of the first (23) and second (24) shelf units. Tube steel is particularly preferable for solid supports comprising the shelf frame 27. Also, it is preferable that the shelf frame 27 of the first shelf unit 23 be formed from tube steel smaller than the tube steel used on the shelf frame 27 of the second shelf unit 24, thereby allowing the smaller tube steel frame to insert inside the larger tube steel frame when the respective shelf units are connected to one another. It is preferable to use twenty-five millimeter square tube steel on the second shelf units 24 and twenty-millimeter square tube steel on the first shelf unit 23. The main body of the shelf units is made of materials that are strong and lightweight, for instance, light wood, plastic, aluminum, composite materials, etc., and they may also be covered by a resilient felt or fabric material typical for use with sound equipment. The first (23) and second (24) shelf units are adapted to connect to one another by a unit connector 29 at facing ends. The unit connector 29 is preferably formed of male ends defining frame ends of a shelf unit that inserts into female receivers on the frame ends of a connecting shelf unit. Thereafter, the unit connector 29 is further secured and tightened down by use of preferable extension stop pins and spring-loaded wingbolts. This is usually accomplished by having the square tube steel of the shelf frame 27 of one of the respective shelf units smaller than the square tube steel of the shelf frame 27 of opposite connecting shelf unit. Preferably the male end is from tube steel and is located on the ends of shelf frame 27 of the first shelf unit 23. The female receivers are disposed on accommodating shelf frame 27 ends of the second shelf unit 24. If the user chooses to use a truncated cart form, and respective truncated shelf fixture, the user must modify the shelf unit, preferably the second shelf unit 24, by installing bracket inserts 30 into the shelf frame 27 at the point where unit connectors 29 would typically receive the male ends of the shelf frame 27 of the first shelf unit 23 (in extended shelf mode). Such bracket inserts 30 when securely fixed allow both ends of second shelf unit 24 to connect to the handles 21 of the folding cart. Bracket inserts 30 are preferably U-brackets that face in the same direction as the connectors on opposite end of the second shelf unit 24.

The present invention has been illustrated in great detail by the above referenced examples, however, it is to be understood that such examples are illustrative and that this invention is not limited by any of the details in the illustrations. Those skilled in the art will understand the present invention is capable of many variations without deviating from the scope of the invention. Accordingly, the claims are to be construed broadly within the scope of the invention.

I claim:

1. A cart caster unit comprising:
   (a) a pneumatic tire featuring a hub fixed to and disposed within said tire;
   (b) a hollow tube axle extending through a central channel of said hub, said tube axle connecting to a horn by securing means at opposite ends of said hollow tube axle;
   (c) said horn connecting to the underside of a bearing retainer unit, said bearing retainer unit having an upper bearing cap;
   (d) where a tube stem extends through said bearing retainer unit,
   (e) wherein said tube stem is defined by a solid lower base portion adjacent the upper bearing cap, and a tubularly hollow, upper portion the solid lower base portion being solid throughout a cross-section thereof;
   (f) wherein the tubularly hollow upper portion defines up to 80% of said exposed portion of an tube stem, said exposed portion of the tube stem being the portion of said tube stem disposed above said upper bearing cap; and,
   (g) wherein the entire caster unit is in the range of 3 to 5 pounds.

2. The cart caster unit of claim 1 wherein the securing means is a cotter pin.

3. The cart caster unit of claim 1 wherein said horn is formed from 1/8 inch steel.

4. The cart caster unit of claim 1 wherein said horn has a plurality of horn holes, whereby the caster unit weight is reduced.

5. The cart caster unit of claim 1 wherein the hub is formed from a polymer plastic.

6. The cart caster unit of claim 1 wherein said hollow tube axle is of a diameter in the range of 15 to 20 millimeters.

7. The cart caster unit of claim 1 wherein said tube stem features at least one tube stem aperture adapted to receive a stem securing means, whereby the caster unit is selectively removable.

8. The cart caster unit of claim 1 wherein said pneumatic tire is in the range of 8 to 10 inches.

9. The cart caster unit of claim 1 wherein said bearing retainer unit features a chatter dampener disposed along the periphery of said bearing retainer unit between the upper bearing cap and an upper retainer of said bearing retainer unit, and whereby caster unit chatter is reduced.

10. The cart caster unit of claim 9 wherein said chatter dampener is an elastomeric O-ring.

* * * * *